F. W. LEUTHESSER.
STEAM, AIR, AND WATER TRAP VALVE.
APPLICATION FILED JUNE 8, 1909.
946,970.
Patented Jan. 18, 1910.
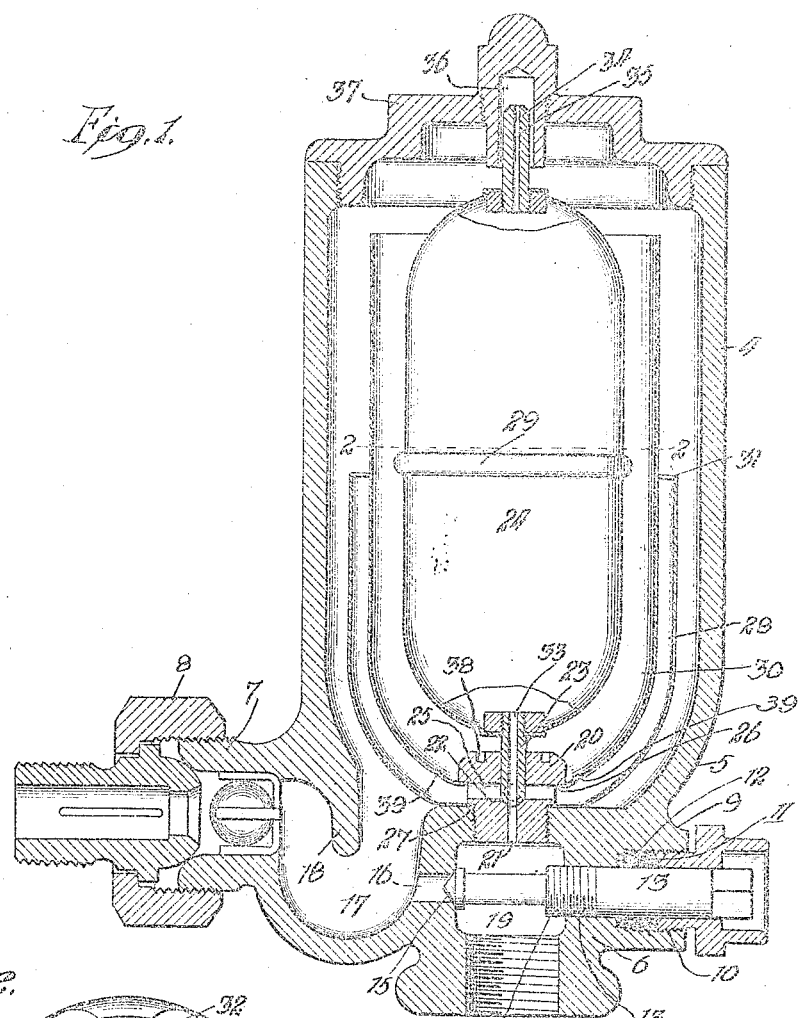
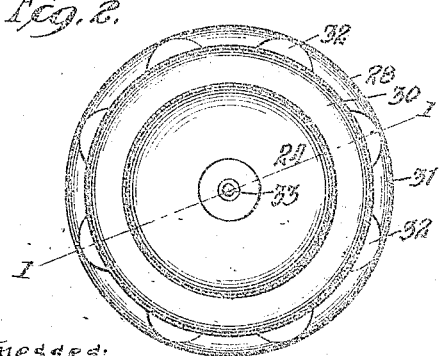
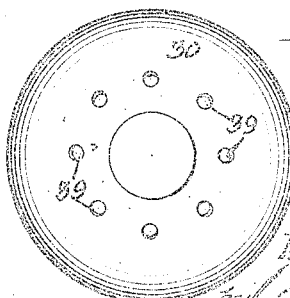
Witnesses:
Inventor:
Fred W. Leuthesser

UNITED STATES PATENT OFFICE.

FRED W. LEUTHESSER, OF CHICAGO, ILLINOIS.

STEAM, AIR, AND WATER TRAP VALVE.

946,970.

Specification of Letters Patent. Patented Jan. 18, 1910.

Application filed June 8, 1909. Serial No. 500,928.

*To all whom it may concern:*

Be it known that I, FRED W. LEUTHESSER, a citizen of the United States, residing at Chicago, in the county of Cook and State of Illinois, have invented certain new and useful Improvements in Steam, Air, and Water Trap Valves, of which the following is a specification.

The trap valve of the present invention is designed more particularly for use on a vacuum steam heating system; and the object of the present invention is to provide means for permitting the escape of air from a radiator to clear the radiator for the ingress of steam, and thereafter to close the valve against the escape of steam and permit the escape of an excess amount of water of condensation. In certain prior valve constructions, designed to accomplish these results, difficulty and annoyance have been experienced by reason of a rattling of the float, which is especially objectionable in buildings such as hospitals, schools, or lecture halls. Furthermore, difficulty has been experienced in the operation of such devices, by reason of the fouling of the parts, due to the accumulation of oil or other refuse, which sometimes coats the movable valve members to such an extent as to interfere with their correct operation.

The object of the present invention is to construct and arrange a valve in such manner as to prevent rattling of the float by maintaining a sufficient body of water around the lower end of the float to exert a certain buoyant action, not sufficient to unseat the float valve, but, nevertheless, sufficient to prevent rattling of the parts during the escape of the water.

A further object of the invention is to provide an inner float cup or well, into which only a limited volume of water will be admitted, and to provide an outer cup or well communicating directly with the valve controlled discharge passage, so that the outflow of the water, when the float is lifted, will not materially agitate the body of water in which the float itself is contained. This further tends to prevent rattling of the float.

Another object of the invention is to so construct the valve as a whole that easy access can be attained to the interior thereof for the purpose of removing the float and surrounding parts, if so desired, for cleaning or repairing.

Further objects will appear from a detailed description of the invention, which consists in the features of construction and combination of parts hereinafter described and claimed.

In the drawings, Figure 1 is a sectional elevation through the center of the float chamber, showing the float itself partly in elevation; Fig. 2, a cross sectional view taken on line 2—2 of Fig. 1, showing the relation of the inner and outer cups to one another; and Fig. 3, a bottom end view of the inner cup.

The valve, as a whole, comprises a cylindrical valve casing 4, the lower end 5 of which is of inverted dome-shape and is provided in its center with a depending neck 6, on one side of which is a laterally extending nipple 7, provided with a coupling 8 adapted to make attachment to a radiator. On the other side of the neck 6 is a boss 9, provided with a threaded recess 10, into which is entered a gland 11, which bears against a packing 12, which packing surrounds a by-pass valve stem 13, threaded at 14 to permit adjustment and provided on its inner end with a conical valve head 15 adapted to control a by-pass 16 communicating with the interior of an inlet passage 17 leading through the nipple 7, which inlet passage is of dish formation and coöperates with an inverted weir 18 in furnishing a trap or water seal. The formation of these features is not claimed as new, so that further description thereof is not deemed necessary.

The neck 6 is bored to provide an outlet passage 19, the upper end of which is closed in part by a screw threaded plug 20, provided with a discharge passage 21 of reduced diameter, the upper end of which discharge passage is beveled to afford a valve seat 22, which co-acts with the beveled or tapered lowered end of a valve stem 23, which depends from and communicates with the interior of an elongated float 24. The tubular valve stem serves to control the discharge of water through a plurality of radiating discharge holes 25, which are cut transversely through the plug 20 at the point of mergence of the reduced discharge passage 21 thereinto, the construction being such that a discharge of water will take place when the tubular valve stem is elevated by the rise of the float.

The plug 20 is of an inverted step formation, being provided with an upper annular shoulder 26 and a lower annular shoulder 27. The lower annular shoulder bears against the floor of an outer cup 28 of inverted dome-shape, which extends up to a point at or slightly below the line of flotation of the float, which, in the present case, is substantially coincident with a bead 29, which girdles the float around its center. The outer cup, which may be termed the discharging cup, coöperates with an inner or float cup 30 likewise of inverted dome-shape, the lower end of which has the plug 20 entered therethrough and is soldered, brazed, or otherwise secured to the under side of the upper shoulder 26. The inner or float cup is of greater height than the outer cup and extends up substantially to the top of the float, being centered in position by a flange 31, which is inturned from the upper edge of the outer cup and is provided at regular intervals with recesses or scallops 32, which afford an easy ingress for the water, and, at the same time, hold the two cups properly spaced with respect to one another.

The tubular valve stem 23 furnishes through its center, an air vent duct 33, which coöperates with an air inlet duct 34 formed through the center of a guide pin 35, which upwardly projects from the top of the float and is entered into a guide recess 36, which is formed in a cap or cover 37 screwed into or on to the upper end of the valve casing. In order to facilitate the assembling or disassembling of the parts, the plug 20 is provided in its top with a pair of recesses 38 adapted to receive a spanner wrench. The inner cup is further provided with a plurality of small holes or openings 39 at or near its lower end, adapted to establish a restricted communication with the interior of the outer cup near the point of discharge therefrom.

In operation, the nipple 7 will be connected with a radiator and the neck 6 will be attached to the return pipe of a vacuum system, or other system, acting under differential pressure. As the air is forced out of the radiator by the ingress of steam, it will pass into the valve casing and up around the cups until it finds its discharge through the duct 34, down through the float and out through the vent openings 33 and 21. This flow of the air will continue until the air has been exhausted, after which the steam will enter the valve casing. As soon as the steam begins to condense, the formation of water of condensation around the walls of the recess 36 and in the air passage 34 will restrict or totally stop the escape of steam. Water of condensation will accumulate in the valve casing until it flows over the rim of the outer cup and into the space intermediate the two cups. The two cups being in communication, the water will rise to an equal level in the inner cup and outer cup and surround the float with a considerable body of water, which will prevent rattling or other objectionable movements of the float. After the valve has been in use a short time, the cup 30 will maintain an approximately constant volume of water, so that the lower end of the float will always be immersed to a very considerable extent. If refuse oil should be admitted into the valve, being lighter than water, it will accumulate on the surface of the body of water contained in the outer cup, but will be excluded from the inner cup, by reason of the fact that the restricted holes or openings 39, which establish communication between the two cups, are located at a level above which the oil will almost always be maintained. After the water of condensation has accumulated above the line of flotation of the float, the latter will be lifted and the necessary amount of water discharged, principally from the outer cup, to again bring the parts to a state of equilibrium. The water will be discharged mainly from the outer cup by reason of the fact that the discharge openings 25 lead directly therefrom, and by reason of the fact that the holes or openings 39 are of small diameter and afford only a restricted flow from the inner cup to the outer cup. The arrangement is one which permits the necessary amount of water to be discharged from the outer cup without materially disturbing the amount of water maintained in the inner cup which surrounds the float. It will thus be seen that the float will not only be immersed to a very considerable extent, but will also be undisturbed by any material agitation due to the out-flow of the water.

Where it is desired to clean the parts, the cap or cover can be readily removed, after which the float can be lifted out and the plug 20 removed by a spanner or similar wrench, which permits of immediate removal of the inner and outer cups and allows access to be easily had to all of the valve passages.

I claim:

1. In a valve of the class described, the combination of a valve casing provided with an inlet and provided with a discharge passage at its lower end, a float within the casing provided with a valve for regulating said discharge passage, and a member within the casing and surrounding the float and constituting a float chamber out of direct communication with the discharge passage, and having a restricted communication with the space immediately surrounding the discharge passage, substantially as described.

2. In a valve of the class described, the combination of a valve casing provided with an inlet and provided with a discharge passage at its lower end, a float within the casing provided with a valve for regulating the said discharge passage, and a member within the chamber and surrounding the float and constituting a float chamber out of direct communication with the discharge passage, and having near its lower end a small hole or opening furnishing a restricted communication with the space immediately surrounding the discharge passage, substantially as described.

3. In a valve of the class described, the combination of a casing provided with an inlet and provided at its lower end with a discharge passage, an outer member, as a cup, within the casing, and an inner member, as a cup, within the outer member and furnishing an annular discharging chamber between said members in direct communication with the discharge passage, the inner member constituting a float chamber out of direct communication with the discharge passage, and having a restricted communication with the annular discharging chamber, and a float located in the float chamber and having a valve controlling the discharge passage, substantially as described.

4. In a valve of the class described, the combination of a casing provided with an inlet and provided at its lower end with a discharge passage, an outer member, as a cup, within the casing, and an inner member, as a cup, within the outer member and furnishing an annular discharging chamber between said members and in direct communication with the discharge passage, the inner member constituting a float chamber out of direct communication with the discharge passage, and having a restricted communication with the annular discharging chamber, and a hollow float within the float chamber provided with a tubular valve stem communicating with the interior of the float and adapted to control the out-flow of water from the discharge passage, and affording an open passage for the discharge of air from the float, the float being provided in its upper portion with an opening for admitting air to its interior, substantially as described.

5. In a valve of the class described, the combination of a valve casing provided with an inlet and provided with a discharge passage, a float within the casing provided with a valve for controlling the out-flow of water through the discharge passage, an outer member, as a cup, within the casing, having its rim near the line of flotation of the float and in direct communication with the discharge passage, and an inner member within the outer member and surrounding the float and constituting a float chamber for protecting the float against agitation due to the out-rush of water, substantially as described.

6. In a valve of the class described, the combination of a valve casing provided with an inlet and provided with a discharge passage, a float within the casing provided with a valve for controlling the out-flow of water through the discharge passage, an outer member, as a cup, within the casing, having its rim near the line of flotation of the float and in direct communication with the discharge passage, and an inner member within the outer member and surrounding the float, and provided with a restricted opening communicating with the space between the two members for protecting the float against agitation due to the out-rush of water, substantially as described.

7. In a valve of the class described, the combination of a valve casing provided with an inlet and provided at its lower end with a vertically extending discharge passage, merging at its upper end into a laterally extending discharge hole, a vertically extending valve having its lower end entered through the laterally extending discharge hole and adapted to seat against the mouth of the discharge passage, a float within the valve casing to which the valve is connected, and a member, as a cup, within the valve casing, surrounding the float and constituting a float chamber out of direct communication with the discharge hole and the discharge passage, substantially as described.

8. In a valve of the class described, the combination of a valve casing provided with an inlet and provided at its lower end with a vertically extending discharge passage, merging at its upper end into a laterally extending discharge hole, a vertically extending valve having its lower end entered through the laterally extending discharge hole and adapted to seat against the mouth of the discharge passage, a float within the valve casing to which the valve is connected, a member, as a cup, within the valve casing, surrounding the float and constituting a float chamber out of direct communication with the discharge hole and the discharge passage, and an outer member, as a cup, within the casing surrounding the inner member and furnishing in conjunction therewith an annular discharging chamber, having direct communication through the discharge hole with a discharge passage, substantially as described.

9. In a valve of the class described, the combination of a valve casing provided with an inlet and provided at its lower end with a vertically extending discharge passage, merging at its upper end into a laterally extending discharge hole, a vertically extending valve having its lower end entered through the laterally extending discharge hole and adapted to seat against the mouth of the discharge passage, a float within the valve casing to which the valve is connected, a member, as a cup, within the valve casing, surrounding the float and constituting a float chamber out of direct communication with the discharge hole and the discharge passage, and an outer member, as a cup, within the casing surrounding the inner member and furnishing in conjunction therewith an annular discharging chamber, having direct communication through the discharge hole with the discharge passage, and having its upper rim near the line of flotation of the float, substantially as described.

10. In a valve of the class described, the combination of a valve casing provided with an inlet and provided at its lower end with a vertically extending discharge passage merging at its upper end into a laterally extending discharge hole, a vertically extending valve having its lower end entered through the laterally extending discharge hole and adapted to seat against the mouth of the discharge passage, a hollow float within the casing to which the valve is connected, and a member, as a cup, within the casing, surrounding the float and furnishing a float chamber out of direct communication with the discharge hole and the discharge passage, the valve being provided with an air vent duct and the float being provided at its upper end with an air inlet duct for permitting the escape of air through the float, substantially as described.

11. In a valve of the class described, the combination of a valve casing provided with an inlet and provided at its lower end with a vertically extending discharge passage merging at its upper end into a laterally extending discharge hole, a vertically extending valve having its lower end entered through the laterally extending discharge hole and adapted to seat against the mouth of the discharge passage, a hollow float within the casing to which the valve is connected, a member, as a cup, within the casing and surrounding the float and furnishing a float chamber out of direct communication with the discharge hole and the discharge passage, and an outer member, as a cup, within the casing and surrounding the inner member and furnishing in conjunction therewith an annular discharging chamber having direct communication through the discharge hole with the discharge passage, the valve being provided with an air vent duct and the float being provided at its upper end with an air inlet duct for permitting the escape of air through the float, substantially as described.

12. In a valve of the class described, the combination of a valve casing provided with an inlet and provided at its lower end with a vertically extending discharge passage merging at its upper end into a laterally extending discharge hole, a vertically extending valve having its lower end entered through the laterally extending discharge hole and adapted to seat against the mouth of the discharge passage, a hollow float within the casing to which the valve is connected, an inner member, as a cup, within the casing and surrounding the float and furnishing a float chamber out of direct communication with the discharge hole and the discharge passage, and an outer member, as a cup, within the casing and surrounding the inner member and furnishing in conjunction therewith an annular discharging chamber having direct communication through the discharge hole with the discharge passage, and having its upper rim near the line of flotation of the float, the valve being provided with an air vent duct and the float being provided at its upper end with an air inlet duct for permitting the escape of air through the float, substantially as described.

FRED W. LEUTHESSER.

Witnesses:
PIERSON W. BANNING,
WM. P. BOND.